United States Patent
Jeong et al.

(10) Patent No.: US 9,742,212 B2
(45) Date of Patent: Aug. 22, 2017

(54) WIRELESS POWER RECEIVER AND ELECTRONIC DEVICE INCLUDING THE SAME

(71) Applicant: Samsung Electro-Mechanics Co., Ltd., Suwon-si (KR)

(72) Inventors: In Wha Jeong, Suwon-si (KR); Jong Heum Park, Suwon-si (KR); Hugh Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 138 days.

(21) Appl. No.: 14/707,182

(22) Filed: May 8, 2015

(65) Prior Publication Data

US 2016/0079765 A1 Mar. 17, 2016

(30) Foreign Application Priority Data

Sep. 11, 2014 (KR) .......................... 10-2014-0120457

(51) Int. Cl.
*H02J 7/00* (2006.01)
*H02J 7/02* (2016.01)
*H02J 50/10* (2016.01)
*H02J 50/05* (2016.01)

(52) U.S. Cl.
CPC .............. *H02J 7/025* (2013.01); *H02J 50/05* (2016.02); *H02J 50/10* (2016.02); *H02J 7/0042* (2013.01); *H02J 7/0055* (2013.01)

(58) Field of Classification Search
CPC .. H02J 7/025; H02J 50/05; H02J 50/10; H02J 5/005; H02J 7/0042; H02J 7/0055
See application file for complete search history.

(56) References Cited

U.S. PATENT DOCUMENTS

2014/0111475 A1* 4/2014 Bae .................... G06F 3/041
345/174
2014/0210406 A1 7/2014 Na et al.

FOREIGN PATENT DOCUMENTS

KR 10-2007-0002721 A 1/2007
KR 10-2013-0024757 A 3/2013

* cited by examiner

*Primary Examiner* — Vuthe Siek
(74) *Attorney, Agent, or Firm* — NSIP Law

(57) ABSTRACT

A wireless power receiver according to an exemplary embodiment in the present disclosure may include a coil receiving power transmitted wirelessly in an inductive-coupling scheme; an electrode receiving power transmitted wirelessly in a capacitive-coupling scheme; and a rectifying unit connected to the coil and the electrode and rectifying input power to output supply power.

6 Claims, 5 Drawing Sheets

A-A'

WIRELESS POWER RECEIVER AND ELECTRONIC DEVICE INCLUDING THE SAME

CROSS-REFERENCE TO RELATED APPLICATION

This application claims priority to, and the benefit of, Korean Patent Application No. 10-2014-0120457 filed on Sep. 11, 2014, with the Korean Intellectual Property Office, the disclosure of which is incorporated herein by reference.

BACKGROUND

This application relates to a wireless power receiver for receiving wirelessly transmitted power, and an electronic device including the same.

Wireless power transfer technology is being applied to the charging of the batteries of various communications devices, including smartphones, as well as those of various home appliances. Wireless power transfer technology has an wide range of applications, which may also be applied to the charging of electric vehicles, and the like, in the future.

In order to transmit power wirelessly, various schemes have been developed and used. However, a wireless power receiver according to the related art may only receive power which has been transmitted wirelessly according to a specific scheme. That is, a wireless power receiver according to the related art has had a problem in that the wireless power receiver may not be able to receive power wirelessly transmitted according to a particular scheme other than that for which the corresponding wireless power receiver was initially designed.

RELATED ART DOCUMENT (Patent Document 1) Korean Patent Laid-Open Publication No. 10-2007-0002721

SUMMARY

An exemplary embodiment in the present disclosure may provide a wireless power receiver receiving wirelessly transmitted power.

An exemplary embodiment in the present disclosure may also provide an electronic device including a wireless power receiver.

According to an exemplary embodiment in the present disclosure, a wireless power receiver may include: a coil receiving power transmitted wirelessly in an inductive-coupling scheme; an electrode receiving power transmitted wirelessly in a capacitive-coupling scheme; and a rectifying unit connected to the coil and the electrode and rectifying input power to output supply power.

According to another exemplary embodiment in the present disclosure, an electronic device including a wireless power receiver may include: a wireless power receiver including a coil receiving power transmitted wirelessly in an inductive-coupling scheme and an electrode receiving power transmitted wirelessly in a capacitive-coupling scheme and outputting supply power; and a load to which the supply power is input.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Figure 1:
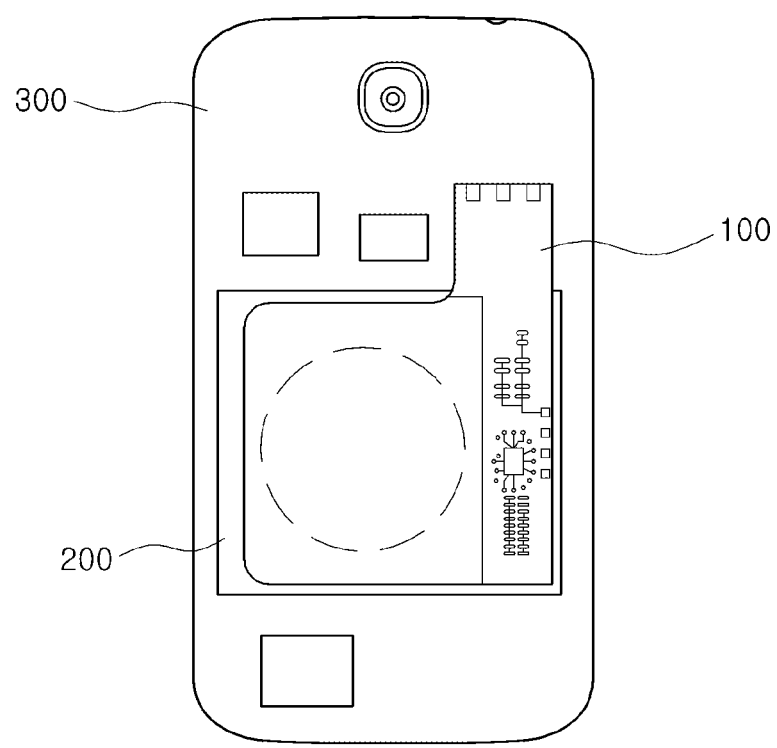
FIG. 1 is a diagram illustrating an example in which a wireless power receiver according to an exemplary embodiment in the present disclosure is mounted in an electronic device.

FIG. 1 is a diagram illustrating an example in which a wireless power receiver according to an exemplary embodiment in the present disclosure is mounted in an electronic device. In FIG. 1, reference numerals 100, 200 and 300 indicate a wireless power receiver, a charger, and an electronic device, respectively.

A function of each block illustrated in FIG. 1 will be described below.

The wireless power receiver 100 may receive power transmitted wirelessly from an external power source and rectify the received power to output the rectified power as supply power. The detailed configuration and operation of the wireless power receiver 100 will be described below with reference to FIGS. 2 through 5.

The supply power may be input to the charger 200 to be stored, and the stored power may be supplied to the electronic device 300.

The electronic device 300 may perform various operations by using the power supplied from the charger 200, such as displaying information. For example, the electronic device 300 may be a mobile terminal. In this case, the electronic device 300 may perform various operations for a voice call or may also access Internet wirelessly to display various text information and/or image information. The electronic device 300 may be directly supplied with the supply power from the wireless power receiver 100 to perform a predetermined operation.

As illustrated in FIG. 1, the wireless power receiver 100 according to an exemplary embodiment in the present disclosure may be mounted on a rear surface of the electronic device 300. That is, a charging terminal connected to the charger 200 may be disposed on the rear surface of the electronic device 300, and the wireless power receiver 100 may be provided with an output terminal outputting the supply power obtained by rectifying the wirelessly received power. By allowing the output terminal of the wireless power receiver 100 to contact the charging terminal of the electronic device 300 so as to be connected to each other, the power wirelessly received by the wireless power receiver 100 may be transferred to the charger 200.

Although the case in which the wireless power receiver 100 according to the exemplary embodiment in the present disclosure is mounted on the rear surface of the electronic device 300 is illustrated in FIG. 1, the wireless power receiver 100 may be mounted in the electronic device 300 by various methods. For example, the wireless power receiver 100 may be connected to a separate port (e.g., a USB port, etc.) included in the electronic device 300.

Further, the wireless power receiver 100 according to the exemplary embodiment may be included in the charger 200 to be integrated with the charger 200. Alternatively, the wireless power receiver 100 may be included in the electronic device 300 to be integrated with the electronic device 300. In the case in which the electronic device 300 is configured to include the wireless power receiver 100, the charger 200 may be detachable to the electronic device 300, or the charger 200 may be configured to be integrated with the electronic device 300.

That is, the electronic device including the wireless power receiver 100 according to the exemplary embodiment in the present disclosure may be configured such that the wireless power receiver 100 and the charger 200 charged with power to supply the charged power are formed integrally with each other. Alternatively, the wireless power receiver 100 and the electronic device 300 performing a predetermined operation using the supplied power may be formed integrally with each other.

Figure 2:
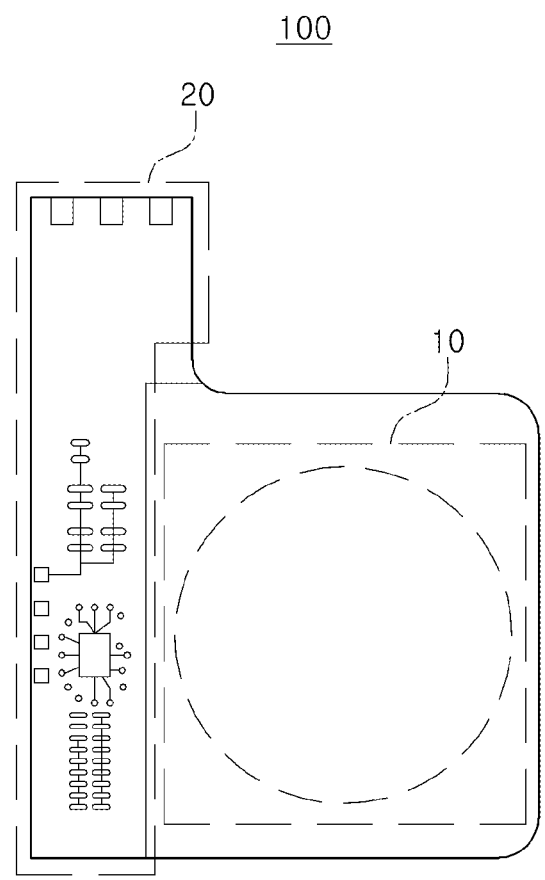
FIG. 2 is a diagram illustrating an example of the wireless power receiver according to an exemplary embodiment in the present disclosure.

FIG. 2 is a diagram illustrating an example of the wireless power receiver according to an exemplary embodiment in the present disclosure. The wireless power receiver 100 according to the present exemplary embodiment may be configured as a printed circuit board (PCB) including a first region 10 in which coils, electrodes, and the like are formed, and a second region 20 in which circuits, electronic components, and the like are mounted.

The wireless power receiver 100 according to an exemplary embodiment in the present disclosure may include a coil for receiving power transmitted wirelessly in an inductive-coupling scheme and an electrode for receiving power transmitted wirelessly in a capacitive-coupling scheme, wherein the coil and the electrode may be disposed in the first region 10.

The wireless power receiver 100 according to an exemplary embodiment in the present disclosure may include a rectifying unit for rectifying the power wirelessly received through the coil or the electrode, and the like, and the rectifying unit may be disposed in the second region 20. Further, the wireless power receiver 100 may additionally include a controlling unit for controlling an operation of the rectifying unit, a communications unit for communicating with a wireless power transmitter transmitting the power wirelessly, and the like. In this case, the controlling unit and/or the communications unit may be disposed in the second region 20. The rectifying unit, the controlling unit, and/or the communications unit may be configured as individual chips or may be configured as a single integrated chip.

Figure 3:
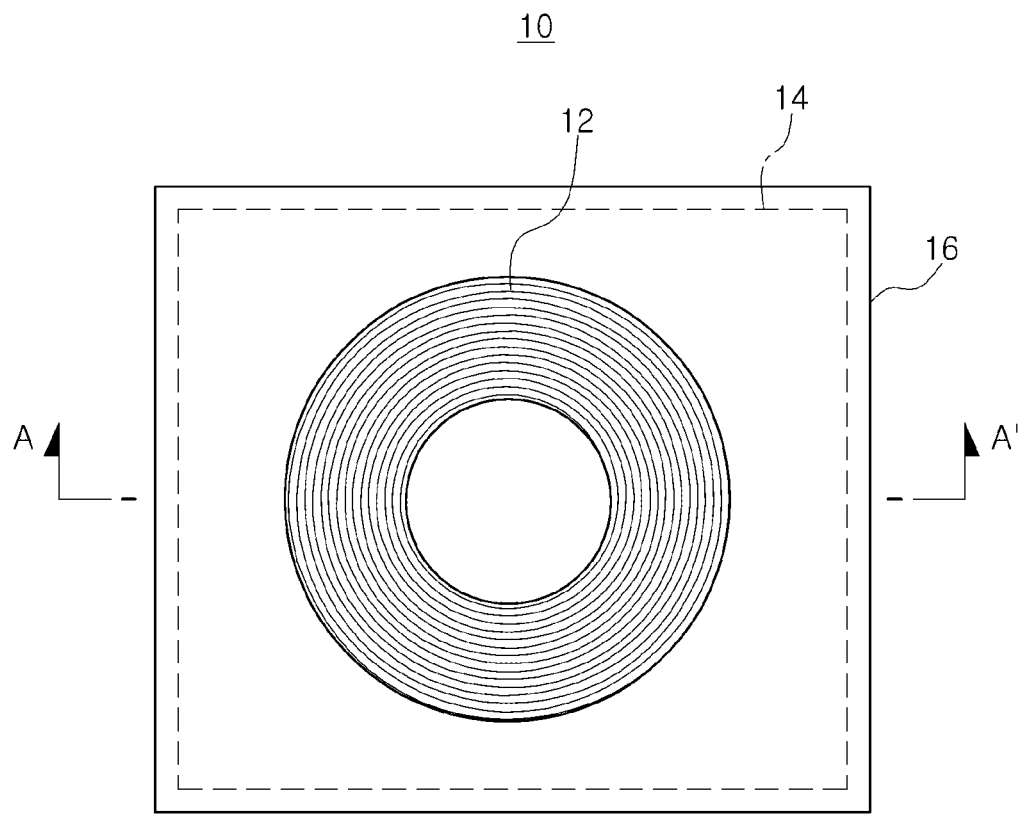
FIG. 3 is a diagram illustrating an example of a first region of the wireless power receiver according to an exemplary embodiment in the present disclosure shown in FIG. 2.
Figure 4:
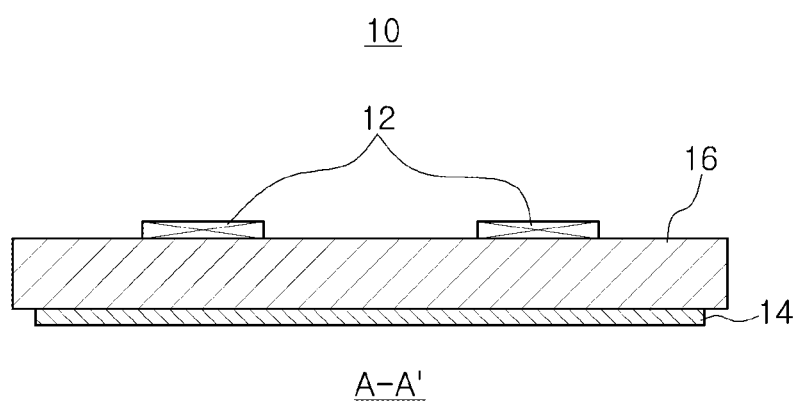
FIG. 4 is a diagram illustrating a cross section of the first region of the wireless power receiver according to an exemplary embodiment in the present disclosure shown in FIG. 3.

FIG. 3 is a diagram illustrating an example of the first region of the wireless power receiver according to an exemplary embodiment in the present disclosure shown in FIG. 2 and FIG. 4 is a diagram illustrating a cross section of the first region of the wireless power receiver according to an exemplary embodiment in the present disclosure shown in FIG. 3. In FIGS. 3 and 4, reference numerals 12, 14 and 16 denote the coil, the electrode, and the printed circuit board, respectively.

As shown in FIGS. 3 and 4, the coil 12 and the electrode 14 may be disposed in the first region 10 of the printed circuit board 16 of the wireless power receiver 100 according to the exemplary embodiment in the present disclosure. In this case, the coil 12 and the electrode 14 may be disposed on different surfaces of the printed circuit board 16. For example, when a surface of the printed circuit board 16 facing the wireless power transmitter to be positioned is a top surface thereof, the coil 12 may be disposed on the top surface of the printed circuit board 16 and the electronic 14 may be disposed on the bottom surface of the printed circuit board 16.

The coil 12 may receive the power transmitted wirelessly in a inductive-coupling scheme and the electrode 14 may receive the power transmitted wirelessly in a capacitive-coupling scheme.

The inductive-coupling scheme is to perform wireless power transmission through a magnetic field and the capacitive-coupling scheme is to perform the wireless power transmission through an electric field. Since the capacitive-coupling scheme is to transmit energy without the leakage of an electric field between a transmitting electrode transmitting the power wirelessly and a receiving electrode receiving the power wirelessly, the capacitive-coupling scheme may have high wireless power transmission efficiency, decrease the size of a circuit for the wireless power transmission, and reduce costs.

Particularly, the capacitive-coupling scheme is to transmit the power wirelessly even in a case in which a metal object is present between the transmitting electrode and the receiving electrode. Therefore, by disposing the coil 12 on the top surface of the printed circuit board 16 of the wireless power receiver 100 in a direction in which the wireless power transmitter is to be positioned, and disposing the electrode 14 on the bottom surface 14 thereof which is opposite to the top surface, the wireless power receiver 100 according to the exemplary embodiment in the present disclosure may receive the power transmitted wirelessly in the capacitive-coupling scheme as well as the power transmitted wirelessly in the inductive-coupling scheme, and the size of the wireless power receiver 100 may also be significantly reduced.

Figure 5:
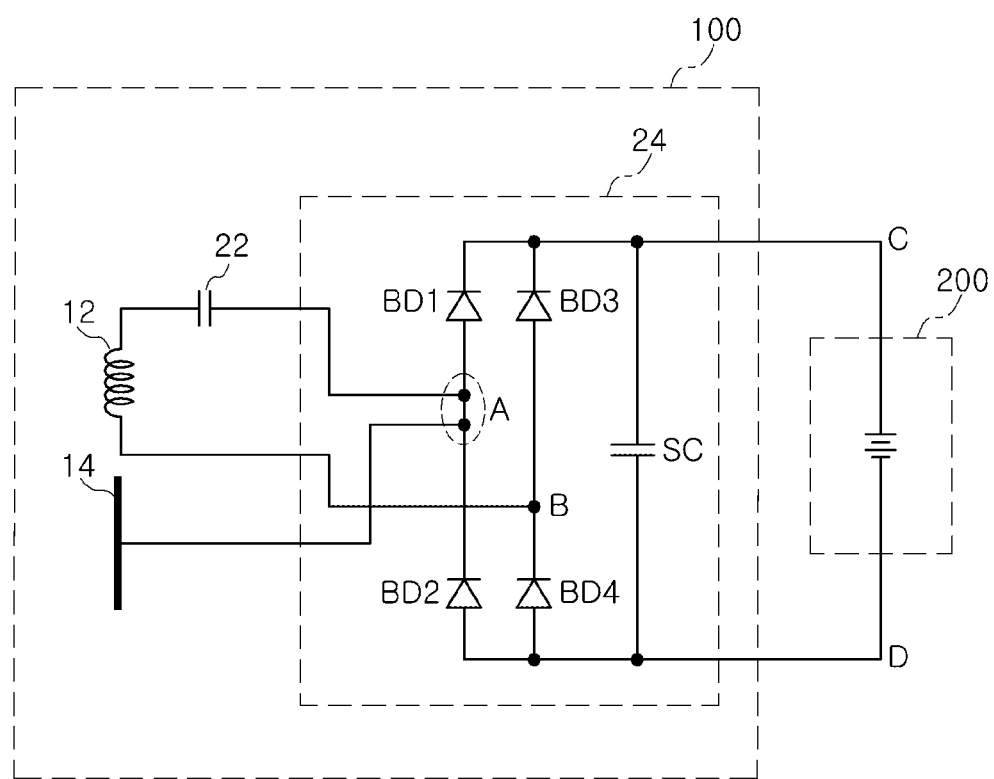
FIG. 5 is a diagram illustrating the configuration of the wireless power receiver according to an exemplary embodiment in the present disclosure.

FIG. 5 is a diagram illustrating the configuration of the wireless power receiver according to an exemplary embodiment in the present disclosure. The wireless power receiver 100 may include the coil 12, the electrode 14, a capacitor 22, and a rectifying unit 24. In addition, the rectifying unit 24 may include four diodes BD1, BD2, BD3, and BD4, and a smoothing capacitor SC. In FIG. 5, reference numeral 200 denotes the charger.

The coil 12 and the capacitor 22 may be connected to each other in series between a first node A and a second node B. The electrode 14 may be connected to the first node A. An anode of the first diode BD1 may be connected to the first node A and a cathode of the first diode BD1 may be connected to a first output terminal C. A cathode of the second diode BD2 may be connected to the first node A and an anode of the second diode BD2 may be connected to a second output terminal D. An anode of the third diode BD3 may be connected to the second node B and a cathode of the third diode BD3 may be connected to the first output terminal C. A cathode of the fourth diode BD4 may be connected to the second node B and an anode of the fourth diode BD4 may be connected to the second output terminal D. That is, the four diodes BD1, BD2, BD3, and BD4 may configure a full bridge circuit. The smoothing capacitor SC may be connected between the first output terminal C and the second output terminal D.

Although the case in which the electrode 14 is connected to the first node A is illustrated in FIG. 5, the electrode 14 may also be connected to the second node B.

A function of each block illustrated in FIG. 5 will be described below.

The coil 12 may receive the power transmitted wirelessly in the inductive-coupling scheme. The capacitor 22, together with the coil 12, may determine a frequency of power to achieve maximum wireless power transmission efficiency. That is, when the frequency of the wireless power is a resonance frequency which is determined by the coil 12 and the capacitor 22, wireless power transmission efficiency through the coil 12 may be maximized.

The electrode 14 may receive the power transmitted wirelessly in the capacitive-coupling scheme.

The rectifying unit 24 may rectify the power wirelessly received by the coil 12 or the power wirelessly received by the electrode 14, to output the rectified power as supply power. Alternatively, the rectifying unit 24 may be simultaneously provided with the power wirelessly received by the coil 12 and the power wirelessly received by the electrode 14 and may rectify the power to output the rectified power as supply power.

Although not shown, the wireless power receiver according to an exemplary embodiment in the present disclosure may further include a regulator. The regulator may be disposed between the rectifying unit 24 and the output terminals C and D. Specifically, the regulator may include a transistor connected between the cathodes of the first diode BD1 and the third diode BD3 and the first output terminal C, and a capacitor connected between the first output terminal C and the second output terminal D.

The coil 12 and the electrode 14 may be disposed in the first region 10 (see FIG. 2) of the printed circuit board of the wireless power receiver 100, and the rectifying unit 24 may be disposed in the second region 20 (see FIG. 2) of the printed circuit board of the wireless power receiver 100. The coil 12 and the electrode 14 may be arranged in the same manner as that shown in FIGS. 3 and 4.

The capacitor 22 may be disposed in the first region 10 (see FIG. 2) or the second region 20 (see FIG. 2) of the printed circuit board of the wireless power receiver 100. When the capacitor is disposed in the first region 10 (see FIG. 2), the capacitor 22 may be disposed to be embedded in the printed circuit board 16 (see FIGS. 3 and 4).

That is, the wireless power receiver 100 according to the exemplary embodiment in the present disclosure may include both of the coil 12 and the electrode 14, and both the coil 12 and the electrode 14 may be connected to one rectifying unit 24. Therefore, the wireless power receiver 100 according to the exemplary embodiment in the present disclosure may receive both of the power transmitted wirelessly in the inductive-coupling scheme and the power transmitted wirelessly in the capacitive-coupling scheme, without a separate additional element, for example, a mode changeover switch, or the like.

The charger 200 may be charged with the power output from the rectifying unit to supply the charged power to the outside.

As described above, the electronic device including the wireless power receiver according to the present exemplary embodiment may be configured such that the wireless power receiver 100 and the charger 200 are formed integrally with each other. In this case, the electronic device may have the same configuration as that shown in FIG. 5. In addition, the electronic device including the wireless power receiver according to the present exemplary embodiment may be configured such that the wireless power receiver 100 and the electronic device 300 (see FIG. 1) are formed integrally with each other. In this case, the charger 200 of FIG. 5 may be substituted by another load, for example, an electronic chip performing a predetermined function, or the like.

Figure 6:
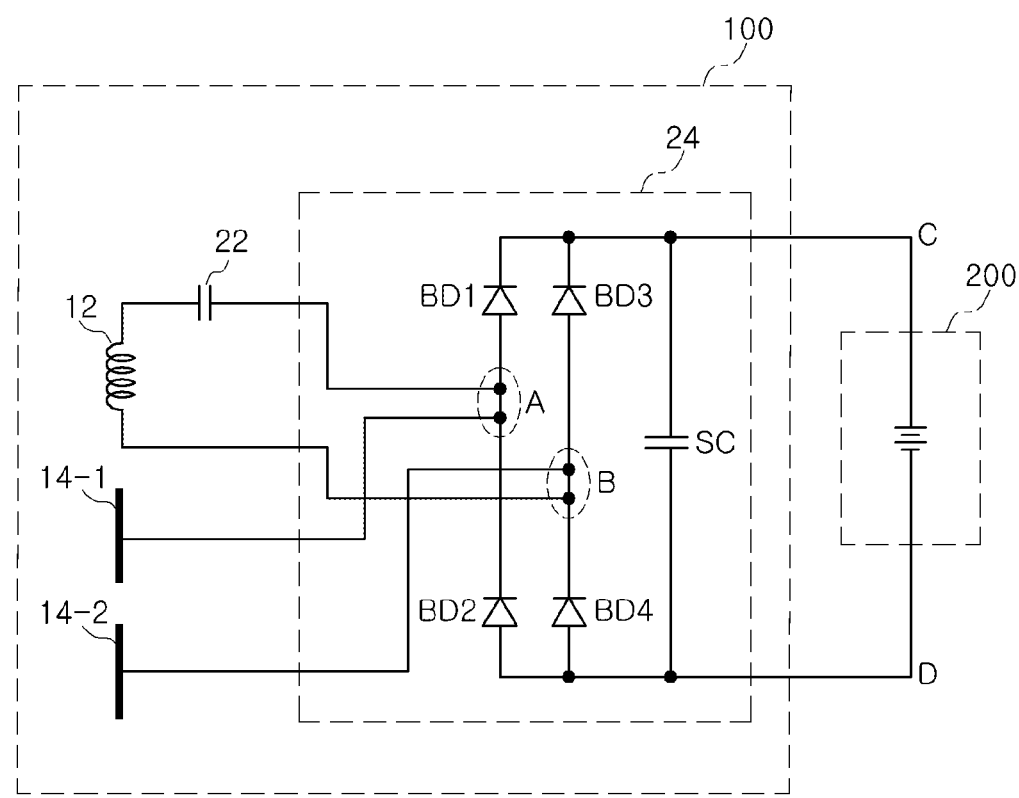
FIG. 6 is a diagram illustrating the configuration of the wireless power receiver according to an exemplary embodiment in the present disclosure.

FIG. 6 is a diagram illustrating the configuration of the wireless power receiver according to an exemplary embodiment in the present disclosure. The wireless power receiver 100 may include the coil 12, electrodes 14-1 and 14-2, the capacitor 22, and the rectifying unit 24. In addition, the rectifying unit 24 may include the four diodes BD1, BD2, BD3, and BD4, and the smoothing capacitor SC. In FIG. 6, reference numeral 200 denotes the charger.

The coil 12 and the capacitor 22 may be connected to each other in series between a first node A and a second node B. The electrode 14-1 may be connected to the first node A and the electrode 14-2 may be connected to the second node B. An anode of the first diode BD1 may be connected to the first node A and a cathode of the first diode BD1 may be connected to a first output terminal C. A cathode of the second diode BD2 may be connected to the first node A and an anode of the second diode BD2 may be connected to a second output terminal D. An anode of the third diode BD3 may be connected to the second node B and a cathode of the third diode BD3 may be connected to the first output terminal C. A cathode of the fourth diode BD4 may be connected to the second node B and an anode of the fourth diode BD4 may be connected to the second output terminal D. That is, the four diodes BD1, BD2, BD3, and BD4 may configure a full bridge circuit. The smoothing capacitor SC may be connected between the first output terminal C and the second output terminal D.

The blocks shown in FIG. 6 may function in the same manner as that of the blocks shown in FIG. 5.

As set forth above, according to exemplary embodiments of the present disclosure, the wireless power receiver and the electronic device including the same may receive all power wirelessly transmitted according to various schemes, without using a separate selection switch.

While exemplary embodiments have been shown and described above, it will be apparent to those skilled in the art that modifications and variations could be made without departing from the scope of the present invention as defined by the appended claims.

What is claimed is:

1. A wireless power receiver comprising:
  a printed circuit board;
  a coil disposed on a first surface of the printed circuit board which is disposed to face a wireless power transmitter transmitting power wirelessly, and the coil receiving power transmitted wirelessly in an inductive-coupling scheme;
  an electrode disposed on a second surface of the printed circuit board, which is opposite to the first surface of the printed circuit board and receiving power transmitted wirelessly in a capacitive-coupling scheme; and
  a rectifying unit connected to the coil and the electrode and rectifying input power input from at least one of the coil and the electrode to output supply power.

2. The wireless power receiver of claim 1, wherein the printed circuit board comprises a first region in which the coil and the electrode are disposed, and a second region in which the rectifying unit is disposed.

3. An electronic device comprising:
   a wireless power receiver including a printed circuit board, a coil disposed on a first surface of the printed circuit board which is disposed to face a wireless power transmitter transmitting power wirelessly, and the coil receiving power transmitted wirelessly in an inductive-coupling scheme, an electrode disposed on a second surface of the printed circuit board, which is opposite to the first surface of the printed circuit board and receiving power transmitted wirelessly in a capacitive-coupling scheme and outputting supply power and a rectifying unit connected to the coil and the electrode and rectifying input power input from at least one of the coil and the electrode to output supply power; and
   a load to which the supply power is input.

4. The electronic device of claim 3, wherein the printed circuit board comprises a first region in which the coil and the electrode are disposed, and a second region in which the rectifying unit is disposed.

5. The electronic device of claim 3, wherein the load is a charger charged with the supply power to output the power charged therein.

6. The electronic device of claim 3, wherein the load includes an electronic chip performing a predetermined operation when the supply power is input thereto.

* * * * *